United States Patent Office 3,551,524
Patented Dec. 29, 1970

3,551,524
NOVEL INTERPOLYMERS
Alvin Stein, Stamford, Conn., assignor to Monsanto Company, St. Louis, Mo., a corporation of Delaware
No Drawing. Filed Jan. 2, 1968, Ser. No. 694,837
Int. Cl. C08f 15/40
U.S. Cl. 260—880
6 Claims

ABSTRACT OF THE DISCLOSURE

There are disclosed novel compositions comprising interpolymers of monomers of an ethylenically unsaturated nitrile, a monovinylidene aromatic hydrocarbon and a norbornene compound. The compositions may be polyblends of a matrix of such an interpolymer and a graft phase comprised of a rubber substrate having a superstrate of the interpolymerized monomers.

BACKGROUND OF THE INVENTION

Copolymers and interpolymers of ethylenically unsaturated nitrile monomers and monovinylidene aromatic monomers are well known and are widely used both as a rigid, unmodified polymer and as polyblends with rubber substrates, e.g., as the so-called SAN crystal (styrene/acrylonitrile) copolymers and the ABS blends (graft copolymers of styrene and acrylonitrile on a preformed butadiene rubber substrate). The suitability of these types of products is limited in certain applications wherein materials having high heat distortion temperatures are required, and so attempts have been made in the past to improve the heat distortion of these polymers by various means, such as by blending the products with other materials, by including modifying monomers in the polymerization reaction or by varying the proportion of components. These attempts have been satisfactory for some purposes. However, in some instances increases in heat distortion temperatures have been accompanied by sacrifice in other desirable properties such as chemical resistance, and in other instances the material has become unduly stiff so as to make its molding quite difficult.

Accordingly, it is an object of the present invention to provide interpolymers of ethylenically unsaturated nitrile and monovinylidene aromatic hydrocarbon monomers which exhibit an improved heat distortion temperature and high chemical resistance while affording a desirable balance of other properties.

It is also an object of the invention to provide such interpolymers by a process which is facile and economically attractive and which does not deviate significantly from the processes noramlly employed for the manufacture of comparable products.

SUMMARY OF THE INVENTION

It has now been found that the foregoing and related objects are readily attained in a composition comprising an interpolymer of monomers of an ethylenically unsaturated nitrile, a monovinylidene aromatic hydrocarbon and a norbornene compound. The norbornene compound corresponds to the general formula:

wherein X is a hydroxyl group or a group having the formula $R_1OH$, $R_1$ representing an alkyl group having from one to three carbon atoms. The substituent designated $R_2$ is selected from the group consisting of a hydrogen atom and alkyl groups having from one to four carbon atoms, and the substrate designated $R_3$ is selected from the group consisting of $R_1OH$ and $R_2$, and is attached to ring carbon atom in either the 2 or the 3 position.

The interpolymer should be comprised of about 5 to 50 percent and preferably 10 to 30 percent of the nitrile monomer, about 1 to 20 percent and preferably about 1 to 5 percent of the norbornene compound, and correspondingly it should contain the monovinylidene aromatic hydrocarbon in an amount of about 30 to 94 and preferably 65 to 89 percent, all of the foregoing percentages being on a weight basis. In preferred embodiments of the invention, the nitrile is either acrylonitrile or methacrylonitrile, the monovinylidene aromatic hydrocarbon is either styrene or alpha-methyl styrene and the norbornene employed is a 2-hydroxyalkyl-5-norbornene, and a particularly desirable product is prepared by interpolymerizing styrene, acrylonitrile and 2-hydroxymethyl-5-norbornene. It may also be desirable to include within the compositions of the present invention about 2.0 to 40.0 percent by weight of a rubber substrate upon which the interpolymer can be grafted in part as a superstrate.

In the process of the invention a polymerization mixture is fomed comprising, on a weight basis, about 4 to 30 parts of an ethylenically unsaturated monomer, about 92 to 40 parts of a monovinylidene aromatic hydrocarbon monomer and about 4 to 30 parts of a norbornene monomer corresponding to the formula herein before indicated. The polymerization mixture is subjected to polymerization conditions for a period of time sufficient to polymerize at least a portion of the monomers present, and the reaction may be conducted en masse or as a dispersion.

DESCRIPTION OF THE PREFERRED EMBODIMENTS

The interpolymer

At least three types of monomers are reacted to produce the interpolymers of the invention, i.e., an ethylenically unsaturated nitrile, a monovinylidene aromatic hydrocarbon and a norbornene compound, although minor amounts of other monomers and more than one of each of the foregoing types of monomers may be included in the reaction mixture.

Exemplary of the unsaturated nitrile which may be used are acrylonitrile, methacrylonitrile, ethacrylonitrile, propacrylonitrile and butacrylonitrile, the first two mentioned nitriles being generally preferred for use by reason of availability, cost and ease of polymerization. The monovinylidene aromatic hydrocarbon compounds employed in the practice of this invention are most usually styrene or alpha-methylstyrene. However, equivalent results are obtained using in place thereof or in combination therewith substituted alkylstyrenes such as, e.g., ortho-, meta- and para-methylstyrenes, 2,4-dimethylstyrene, para-ethylstyrene, etc.; substituted halostyrenes such as, e.g. alpha-chlorostyrene, 2,4-dichlorostyrene, ortho-, meta- and para-chlorostyrenes or bromostyrenes, etc.; and substituted alkyl halo styrenes such as, e.g., 2-methyl-4-chlorostyrene, etc. The alkyls are generally from 1 to 4 carbons and may include, in addition to those shown above, isopropyl, isobutyl, etc. As has been indicated, mixtures of such vinylidene aromatic compounds may be used, and it is frequently beneficial to include a proportion of alpha-methylstyrene in the reaction mixture to further enhance the heat distortion temperature characteristic of the resulting interpolymer.

The norbornene compounds which are valuable in preparing the present interpolymers having improved chemical resistance and heat distortion temperatures are those which conform to the structural formula:

wherein X is a hydroxy radical or a hydroxyalkyl group having the formula $R_1OH$, $R_1$ being an alkyl group having from one to three carbon atoms. $R_2$ is either a hydrogen atom or a $C_1$ to $C_4$ alkyl group, and $R_3$ is either $R_1OH$ or $R_2$. $R_3$ is positioned in either the 2 carbon atom of the ring (to result in disubstitution thereon) or the 3 carbon atom, and it should be noted that the substituent designated $R_3$ is independent of the particular composition of the other substituents $R_1OH$ or $R_2$. Thus, for example although both $R_2$ and $R_3$ may be selected from the group consisting of hydrogen and alkyl groups having one to four carbon atoms, $R_2$ may be methyl when $R_3$ is hydrogen, and vice versa.

The preferred norbornenes are those of the foregoing formulas wherein $R_2$ and $R_3$ are hydrogen atoms and X represents $R_2OH$, and in the most preferred instance $R_1$ represents methyl, so the most preferred compound is 2-hydroxymethyl - 5 - norbornene. Examplary alternate 5-norbornenes are the 2-hydroxy, 2,2-bis-(hydroxymethyl), 2,3-bis-(hydroxymethyl), x-methyl-2-hydroxy, x-methyl-2-hydroxymethyl, 2 - methyl-2-hydroxymethyl, x-methyl-2,2-bis-(hydroxymethyl), and x-methyl-2,3-bis-(hydroxymethyl) derivatives, the $x$ designating placement on various ring atoms. These derivatives may be prepared by any method known in the art, the relatively simple Diels-Alder condensation type of reaction being particularly suitable wherein, for example, a cyclopentadiene is reacted with an allyl alcohol.

Although the interpolymers may be comprised of the foregoing monomeric compounds in a wide range of proportions, in a preferred embodiment the interpolymers will be comprised of from about 5 to 50, and more preferably from about 10 to 30 percent by weight of the nitrile monomer, from about 30 to 94, and more preferably from about 65 to 89 percent by weight of the vinylidene aromatic compound and from about 1 to 20, and more preferably from about 1 to 5 percent by weight of the norbornene compound.

Minor amounts, i.e., less than about 10 percent of other monomers may be included in the reaction mixture such as conjugated 1,3-dienes, e.g. butadiene, isoprene, etc.; alpha- or beta-unsaturated monobasic acids and derivatives thereof, e.g., acrylic acid, methyl acrylate, ethyl acrylate, butyl acrylate, 2-ethylhexyl acrylate, methacrylic acid and the corresponding esters thereof, acrylamide, methacrylamide; vinyl esters such as vinyl acetate, vinyl propionate, etc.; dialkyl maleates or fumarates such as dimethyl maleate, diethyl maleate, dibutyl maleate, the corresponding fumarates, etc. As is known in the art, the amount of these comonomers which may be included in the interpolymer will vary as the result of various factors.

The novel interpolymers of this invention may be manufactured by well known techniques, for example, by mass polymerization, by emulsion or suspension polymerization, etc. Any free radical generating catalyst may be used in the practice of the invention, typical of which are the peroxide catalysts, azo catalysts, actinic radiation, etc. The choice of catalysts will be obvious to those skilled in the art and this invention is not to be limited in this regard. Temperature is of importance only as regards the generation of free radicals and is generally adjusted to effect interpolymerization within reasonably short periods of time without letting the reaction rate become uncontrollable. Temperatures of from about $-20°$ to $250°$ centigrade are not unusual, but preferably polymerization will be effected at temperatures of about $25°$ to $150°$ centigrade.

Graft polyblend

As has been mentioned, polyblends prepared by polymerizing the monomers of the interpolymers in presence of a rubber produces a graft polyblend of the rubber and interpolymer components. The resulting composition is a polyblend having a graft phase consisting of a superstrate of the interpolymerized monomers upon the rubbery substrate and a matrix which consists of the interpolymerized monomers.

Various rubbers, included in the reaction mixture in an amount of about 2.0 to 40.0 percent based upon the total weight thereof, are utilizable as the substrate of the graft copolymer. They include diene rubbers, ethylene-propylene rubbers, acrylate rubbers, polyisoprene rubbers, and mixtures thereof, as well as interpolymers thereof with each other or other copolymerizable monomers. The preferred rubbers are diene rubbers or mixtures of diene rubbers, i.e. any rubbery polymers (a polymer having a second order transition temperature not higher than 0° centigrade, preferably not higher than $-20°$ centigrade, as determined by ASTM Test D–746–52T) of one or more conjugated 1,3-dienes, e.g., butadiene, isoprene, piperylene, chloroprene, etc. Such rubbers include homopolymers and interpolymers of conjugated 1,3-dienes with up to an equal amount by weight of one or more copolymerizable monoethylenically unsaturated monomers, such as monovinylidene aromatic hydrocarbons (e.g., styrene; an aralkylstyrene, such as the o-, m- and p-methylstyrenes, 2,4-dimethylstyrene, the ar-ethylstyrenes, p-tert-butylstyrene, etc.; an alpha-alkylstyrene, such as alpha-methylstyrene, alpha-ethylstyrene, alpha-methyl-p-methylstyrene, etc.; vinyl naphthalene, etc.); arhalo monovinylidene aromatic hydrocarbons (e.g., the o-, m- and p-chlorostyrenes, 2,4-dibromostyrene, 2-methyl-4-chlorostyrene, etc.); acrylonitrile, methacrylonitrile; alkyl acrylates (e.g. methyl acrylate, butyl acrylate, 2-ethylhexyl acrylate, etc.), the corresponding alkyl methacrylates, acrylamides (e.g., acrylamide, methacrylamide, N-butyl acrylamide, etc.); unsaturated ketones (e.g. vinyl mehtyl ketone, methyl isopropenyl ketone, etc.); alpha-olefins (e.g. ethylene, propylene, etc.); pyridines; vinyl esters (e.g. vinyl acetate, vinyl stearate, etc.); vinyl and vinylidene halides (e.g. the vinyl and vinylidene chlorides and bromides, etc.); and the like.

A preferred group of rubbers are those consisting essentially of 75.0 to 100.0 percent by weight of butadiene and/or isoprene and up to 25.0 percent by weight of a monomer selected from the group consisting of monovinylidene aromatic hydrocarbons (e.g. styrene) and unsaturated nitriles (e.g. acrylonitrile), or mixtures thereof. Particularly advantageous substrates are butadiene homopolymer or an interpolymer of 90.0 to 95.0 percent by weight butadiene and 5.0 to 10.0 percent by weight of acrylonitrile or styrene.

Exemplary of the efficacy of the present invention are the following specific examples, wherein all parts and percentages are on a weight basis unless otherwise indicated.

EXAMPLE 1

Part A—Control

A reaction mixture is prepared by admixing 72 parts of styrene monomer and 28 parts of acrylonitrile monomer in a suitable reaction vessel. After introducing 0.05 part of di-t-butyl peroxide (DTBP) catalyst, the vessel is sealed and heated to about 140° centigrade. The contents of the vessel are agitated and maintained at this temperature for about 6.5 hours, after which the vessel is vented and the contents thereof recovered and cooled.

Part B

The procedure of Part A is substantially repeated but the composition of the reaction mixture is varied by replacing 5 parts of the styrene monomer with 2-hydroxymethyl-5-norbornene. The product recovered is a homogeneous solid polymer.

Part C

The procedure of Part A is substantially repeated with 20 parts of the styrene monomer being replaced with 2-hydroxymethyl - 5 - norbornene. Analysis of the product recovered for hydroxyl content indicates that the product contains about 4.4 percent of 2 - hydroxymethyl - 5 - norbornene.

The products from Parts A, B and C are tested to determine their glass transition (Tg) temperatures, which are indicative of their respective heat distortion temperatures. The results of these tests are presented in Table I following.

TABLE I

| | Composition of reaction mixture (parts) | | | |
|---|---|---|---|---|
| | Styrene | Acrylo-nitrile | 2-hydroxy methyl-5-norbornene | Tg (° C.) |
| Part: | | | | |
| A | 72 | 28 | 0 | 92.5 |
| B | 67 | 28 | 5 | 94.0 |
| C | 52 | 28 | 20 | 105.0 |

Hence, it is seen that in each case the addition of the norbornene compound to the styrene and acrylonitrile monomers results in interpolymers having sigificantly improved heat distortion characteristics. In each instance, the interpolymers are found also to exhibit improved chemical resistance, as compared to the styrene/acrylonitrile copolymer containing no norbornene compound.

EXAMPLE 2

The procedure of Example 1 is substantially repeated employing the reaction mixtures specified below. The resulting interpolymers have higher heat distortion temperatures and better chemical resistance as compared to comparable polymers from which the norbornene compound is omitted.

Part A

The reaction mixture contains 65 parts of styrene, 20 parts of acrylonitrile and 15 parts of 2 - hydroxy - 5 - norbornene.

Part B

This reaction mixture comprises 55 parts of styrene, 5 parts of alpha-methylstyrene, 28 parts of acrylonitrile and 12 parts of 2 - hydroxymethyl-5-norbornene.

Part C

A reaction mixture containing 50 parts of styrene, 25 parts of methacrylonitrile and 25 parts of 2,2-bis-hydroxymethyl-5-norbornene, is used.

Part D

The reaction mixture is comprised of 85 parts of alpha-methylstyrene, 10 parts of acrylonitrile and 5 parts of 2,3-bis-hydroxymethyl-5-norbornene.

Part E

This reaction mixture contains 75 parts of 2,4-dimethylstyrene, 15 parts of acrylonitrile and 10 parts of 2-hydroxymethyl-5-norbornene.

Part F

The reaction mixture of this part comprises 55 parts of styrene, 10 parts of methyl methacrylate, 20 parts of methacrylonitrile and 15 parts of 2-hydroxy-5-norbornene.

EXAMPLE 3

A solution of 16 percent of butadiene rubber dissolved in a monomer mixture containing 70 percent of styrene, 25 percent of acrylonitrile and 5 percent of 2-hydroxymethyl - 5 - norbornene is polymerized en masse to about 30 percent conversion of the monomer mixture to form a partially polymerized syrup. A portion of this syrup amounting to about 800 parts is dispersed in about 1000 parts of water which contains a small amount of a DTBP polymerization initiator, along with a small amount of a suspending agent. Thereafter, polymerization of the monomers is continued in suspension, at the completion of which the product is recovered in the form of beads of polymer. Molded specimens prepared from this product are found to exhibit heat distortion temperatures and chemical resistance characteristics which are improved as compared to comparable products from which the norbornene compound is omitted.

Accordingly, it can be seen that the present invention provides interpolymers of ethylenically unsaturated nitriles and monovinylidene aromatic hydrocarbon monomers which exhibit improved heat distortion temperatures and high chemical resistance while affording a desirable balance of other properties. The interpolymers are provided by a process which is facile and economically attractive and which does not deviate significantly from the processes normally employed for the manufacture of comparable products.

What is claimed is:
1. An interpolymer consisting essentially of
   (A) an ethylenically unsaturated nitrile selected from the group consisting of acrylonitrile, methacrylonitrile, ethacrylonitrile, propacrylonitrile, butacrylonitrile and mixtures thereof,
   (B) a monovinylidene aromatic hydrocarbon selected from the group consisting of styrene, alpha-methylsytrene, ring-substituted alkylstyrenes, halo-styrenes, ring-substituted alkyl halostyrenes and mixtures thereof, and
   (C) about 1 to 20 percent by weight based on the weight of the total monomer species of a norbornene compound corresponding to the general formula:

wherein X is selected from the group consisting of a hydroxy radical and $R_1OH$ wherein $R_1$ is an alkyl group having from one to three carbon atoms, $R_2$ is selected from the group consisting of hydrogen and alkyl groups having one to four carbon atoms and $R_3$ is selected from the group consisting of $R_1OH$ and $R_2$, $R_3$ being attached to a ring carbon atom selected from the class consisting of carbon atoms in the 2 and 3 positions.

2. The composition of claim 1 wherein said interpolymer is comprised of about 5 to 50 percent of said nitrile, about 1 to 20 percent of said norbornene compound and about 30 to 94 percent of said monovinylidene aromatic hydrocarbon, all on a weight basis.

3. The composition of claim 1 wherein said interpolymer is comprised of about 10 to 30 percent of said nitrile, about 1 to 5 percent of said norbornene compound and about 65 to 89 percent of said monovinylidene aromatic hydrocarbon.

4. The composition of claim 1 wherein said nitrile is selected from the group consisting of acrylonitrile and methacrylonitrile, said monovinylidene aromatic hydrocarbon is selected from the group consisting of styrene and alpha-methyl styrene and $R_2$ and $R_3$ of said norbornene are hydrogen atoms.

5. The compound of claim 1 wherein said nitrile monomer is acrylonitrile, said monovinylidene aromatic hydrocarbon monomer is styrene and said norbornene is 2-hydroxymethyl-5-norbornene.

6. The composition of claim 1 containing about 2.0 to 40.0 percent by weight of a rubber substrate upon which said interpolymer is grafted as a superstrate.

References Cited

UNITED STATES PATENTS

| | | | |
|---|---|---|---|
| 2,900,359 | 8/1959 | Chapin et al. | 260—80.75 |
| 2,985,611 | 5/1961 | Gaylord et al. | 260—80.75 |
| 3,047,534 | 7/1962 | Dyer et al. | 260—880 |
| 3,367,995 | 2/1968 | Yoshino et al. | 260—880 |

JAMES A. SEIDLECK, Primary Examiner

U.S. Cl. X.R.

260—80.78, 85.5, 878, 885